United States Patent [19]
Parmentier et al.

[11] Patent Number: 5,997,287
[45] Date of Patent: Dec. 7, 1999

[54] FURNACE FOR ACTIVATING A WOVEN OR NON-WOVEN TEXTILE SHEET BASED ON CONTINUOUS CARBONIZED FILAMENTS OR SPUN CARBONIZED YARN

[75] Inventors: Philippe Parmentier, Villeurbanne; Charles Manin, Fontaines sur Saone, both of France

[73] Assignee: Carbone Industrie, France

[21] Appl. No.: 09/181,865

[22] Filed: Oct. 29, 1998

Related U.S. Application Data

[62] Division of application No. 08/751,053, Nov. 15, 1996, Pat. No. 5,928,986.

[30] Foreign Application Priority Data

Nov. 17, 1995 [FR] France ................................. 95 13892

[51] Int. Cl.⁶ ........................................................ F27B 9/28
[52] U.S. Cl. ........................................................ 432/59
[58] Field of Search .................................. 432/8, 59, 121, 432/129, 133

[56] References Cited

U.S. PATENT DOCUMENTS

| | | |
|---|---|---|
| 4,973,243 | 11/1990 | Deambrosio et al. ............... 432/8 |
| 5,193,996 | 3/1993 | Mullen ........................................ 432/59 |
| 5,364,007 | 11/1994 | Jacobs et al. .......................... 432/59 |
| 5,855,476 | 1/1999 | Gottschalk .............................. 432/59 |

FOREIGN PATENT DOCUMENTS

| | | |
|---|---|---|
| 0 626 548 | 11/1994 | European Pat. Off. . |
| 20 27 131 | 12/1971 | Germany . |

OTHER PUBLICATIONS

Chemical Abstracts, v. 104 (1986) Jan., No. 2, Columbus, Ohio, U.S.A., p. 67, 104:7109s: "Activation of carbon fibers", Nakanishi et al.

*Primary Examiner*—Mark Paschall
*Assistant Examiner*—Gregory A. Wilson
*Attorney, Agent, or Firm*—Bacon & Thomas PLLC

[57] ABSTRACT

An activation furnace for activating a fiber sleet having carbonized yarn filaments includes a horizontal activation enclosure containing a heater, an inlet section and an outlet section through which the fiber sheet travels. A supply of oxidizing gaseous fluid is provided within the enclosure, that further includes one heat treatment zone and, at opposite ends of the enclosure, a temperature-raising zone and a temperature-lowering zone. The inlet and outlet sections are fitted with airlocks connected to cooling and suction devices.

49 Claims, 5 Drawing Sheets

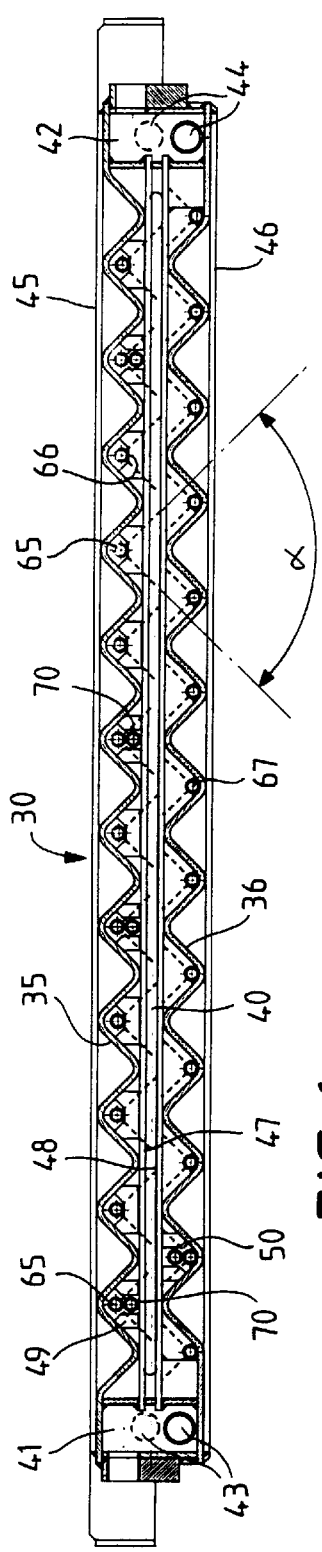

FURNACE FOR ACTIVATING A WOVEN OR NON-WOVEN TEXTILE SHEET BASED ON CONTINUOUS CARBONIZED FILAMENTS OR SPUN CARBONIZED YARN

This application is a Division of nonprovisional application Ser. No. 08/751,053 filed Nov. 15, 1996, now U.S. Pat. No. 5,928,986.

FIELD OF THE INVENTION

The present invention relates to the field of fibrous sheets based on carbonized filaments and used for making filter elements in numerous applications, of which the following may be mentioned: air conditioning techniques; installations for solvent-based treatments; chemically polluted media; etc.

The invention relates more particularly, but not exclusively, to sheets suitable for being subjected to regeneration treatment methods after saturation, in particular by adsorption or desorption.

BACKGROUND OF THE INVENTION

The principle whereby such sheets based on carbonized filaments or yarn are activated consists in subjecting such filaments or yarn to oxidation to increase the surface microporosity thereof so as to develop a special surface favorable for retaining molecules. Such a surface thus offers numerous fixing sites which define the retention power and thus the filtering power of a fibrous sheet interposed as a screen for passing through between two different media between which a liquid or gaseous fluid flows in one direction, or the other, or in both directions, conveying polluting molecules that are to be retained.

Such a technique can be considered as known in principle and applicable to woven or non-woven textile sheets based on or totally constituted by continuous carbonized filaments or spun carbonized yarn.

There have been several proposals in the prior art in this field and they can be classified in two families.

The first family corresponds to that which can be referred to as a "discontinuous method", as illustrated, for exemple, by patent GB 1 570 177.

The second family corresponds to a treatment technique that can be referred to as "continuous" and it is illustrated by patent GB 1 310 011 and application EP 0 626 548.

The present invention relates specifically to the activation technique corresponding to the second family.

For continous activation treatment, the above British patent recommends placing vertically-extending heater means face to face in an enclosure leaving between them a passage along which a fibrous sheet travels upwardly and is thus subjected on both faces to the action of the heater elements.

A nozzle for dispensing or feeding an oxidizing gaseous fluid is provided from the bottom of the enclosure so as to fill the passage along which the sheet travels with said fluid.

On the basis of that proposition which is already several tens of years old, it was expected that activation would take place suitable for giving satisfaction in the intended implementation.

In fact, that manner of proceeding seems to be incapable of leading to satisfactory and reproducible results for several reasons.

Firstly, the vertical disposition cannot be considered as providing a uniform distribution of the oxidizing gaseous fluid which is subjected to a turbulent type upward flow mainly because of the heat given off by the heater elements and because of the thermal updraft which is established in the passage.

Thus, the action of such an oxidizing fluid cannot be considered as being performed in sufficiently uniform manner from the bottom to the top of the sheet and the fibers thereof are inevitably subjected to non-negligible temperature differences.

Also, in the recommended disposition, there does not exist any genuine confinement volume for the oxidizing gaseous fluid whose upward flow cannot be properly controlled relative to the upward vertical displacement of the sheet that is to be treated.

According to the English patent, the structural dispositions described seek to dispose the rollers of payout and takeup spools inside the enclosure, thus necessarily giving rise to an access problem during which the enclosure must be opened.

Given the nature of the oxidizing gaseous fluids and of the internal reactions that take place during activation, it is therefore necessary to take considerable precautions prior to opening the enclosure to avoid any leak of gas molecules that could harm the environment or the staff operating such an installation.

Given the general configuration recommended, it is also important in that technique to provide bends in the path so as to cause only that portion of the sheet which extends between the heater elements to travel vertically. Rollers or analogous deflector members are therefore necessary and impart mechanical stresses to the fibers before and after treatment without it being possible to ensure appropriate stabilization of mean temperature, either by progressively raising the temperature before activation or by lowering said temperature after coming out from the heater elements.

Application EP 0 626 548 describes a method and an apparatus for high-speed oxidation of a textile sheet based on organic fibers. According to that application, the textile sheet to be treated passes through a chamber containing an oxidizing atmosphere raised to a temperature lying in the range 200° C. to 300° C. The fibrous sheet to be treated is guided by cooling rollers disposed outside the oxidizing chamber so as to ensure that the sheet passes several times therethrough in succession. Those cooling rollers prevent the temperature of the sheet rising excessively. Finally, according to that application, the sheet travels through the chamber at a linear speed lying in the range 10 meters per minute (m/min) and 50 m/min.

In use, it has turned out that the conditions under which that method is implemented, in particular the conditions relating to travel speed and the temperatures reached, do not enable optimum oxidation of sheets based on carbonized filaments to be obtained.

In addition, the use of cooling rollers for deflection purposes subjects the sheet being treated to stresses that can spoil its mechanical qualities.

Finally, the successive deflections make it necessary to provide a certain number of inlet and outlet zones for the sheet through the walls of the oxidizing chamber, thus constituting as many openings through which polluting gases produced by the oxidation reactions can escape.

OBJECT AND SUMMARY OF THE INVENTION

The object of the present invention is to remedy the drawbacks of the prior art by proposing a novel activation furnace enabling a continuous type treatment technique to be implemented that is favorable for performing activation treatment which provides carbonized fibers with a uniform and large specific surface area, thus giving the treated and activated sheets considerable and reproducible retention characteristics.

The invention seeks to achieve the above results while offering a high level of safety to staff running the process, performing maintenance, and operating the activation furnace.

The invention provides an activation furnace for activating a fibrous sheet comprising carbonized yarn or filaments, the furnace including an activation enclosure containing heater means and possessing an inlet section and an outlet section through which a continuous fibrous sheet may travel so as to pass through the enclosure, and comprising means for diffusing an oxidizing gaseous fluid within said enclosure, said activation enclosure extending horizontally and defining therein at least one heat treatment zone, and at opposite ends thereof, a temperature-raising zone and a temperature-lowering zone;

said inlet and outlet sections being fitted with air locks connected to cooling and suction means.

BRIEF DESCRIPTION OF THE DRAWINGS

Various other characteristics appear from the following description given with reference to the accompanying drawings which show embodiments of the invention as non-limiting examples.

FIG. 6 is a cross-section line VI—VI of FIG. 5.

FIG. 7 is a fragmentary elevation section on a larger scale showing an embodiment detail of an element of the invention.

MORE DETAILED DESCRIPTION

Figure 1:
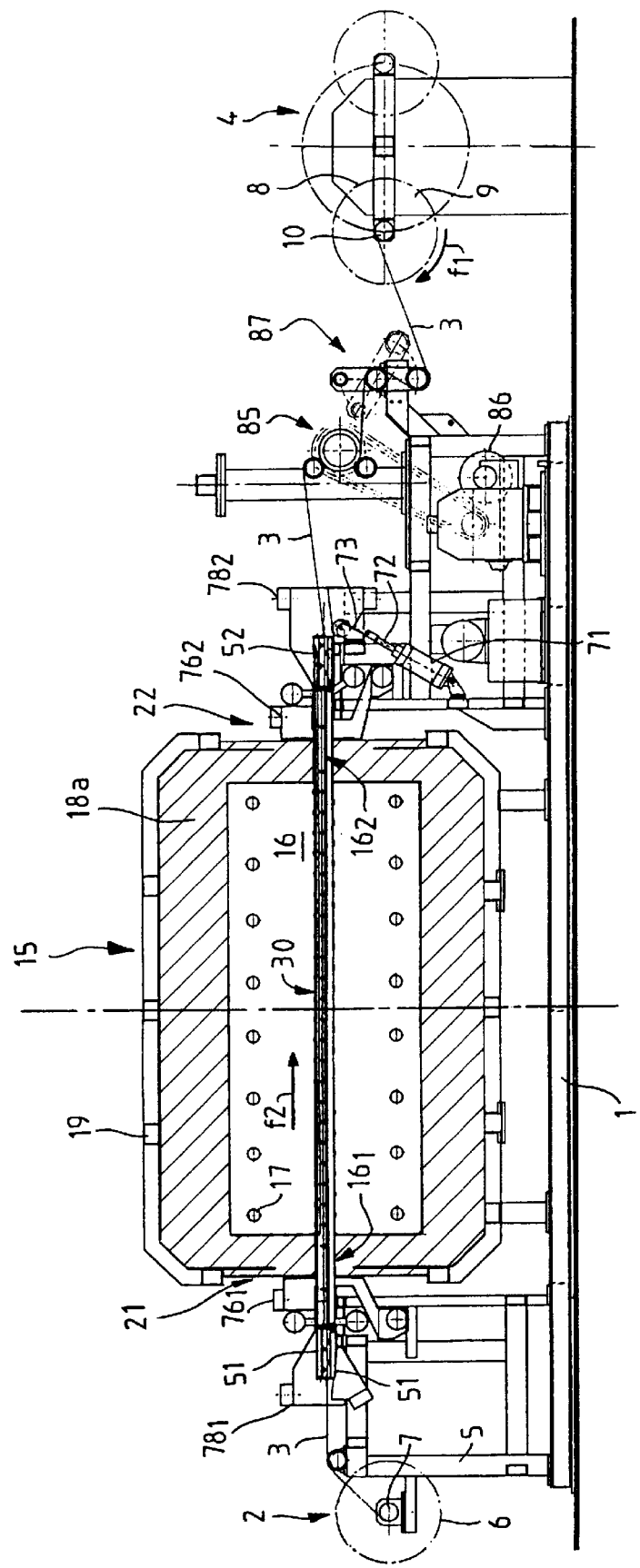
FIG. 1 is a diagrammatic elevation of an installation for implementing the method.

FIG. 1 is a diagram of an installation for implementing the activation method of the invention. Such an installation comprises a support frame 1 whose ends carry a feed station 2 for feeding a fibrous sheet 3 and a takeup station 4 for taking up said sheet after treatment. The term "fibrous sheet" is used to cover any woven or non-woven textile sheet made on the basis of continuous or discontinuous filaments or of spun yarn that have been carbonized by appropriate prior treatment. The station 2 is constituted by an unwinder 5 for paying out from a spool 6 mounted to rotate freely on bearings 7. The station 4 is constituted by a winder 8 formed by at least one spool 9 likewise mounted to rotate freely on bearings 10, but also associated with a motor (not shown) for rotating it, e.g. in the direction of arrow $f_1$.

The bearings 7 and 10 define two mutually parallel axes for the spools, which axes are horizontal and perpendicular to a plane along which the sheet 3 travels horizontally in the direction of arrow $f_2$.

According to the invention, there is provided a furnace 15 carried by the support frame 1 so as to be located between the stations 2 and 4. The furnace 15 defines at least one horizontal heat treatment zone 16 associated with heater means 17 advantageously constituted by electrical resistance elements spaced apart and disposed either to surround the zone 16 or else to extend parallel to the horizontal plane P–P' defined thereby, in which case they are situated above and below the plane.

Figure 2:
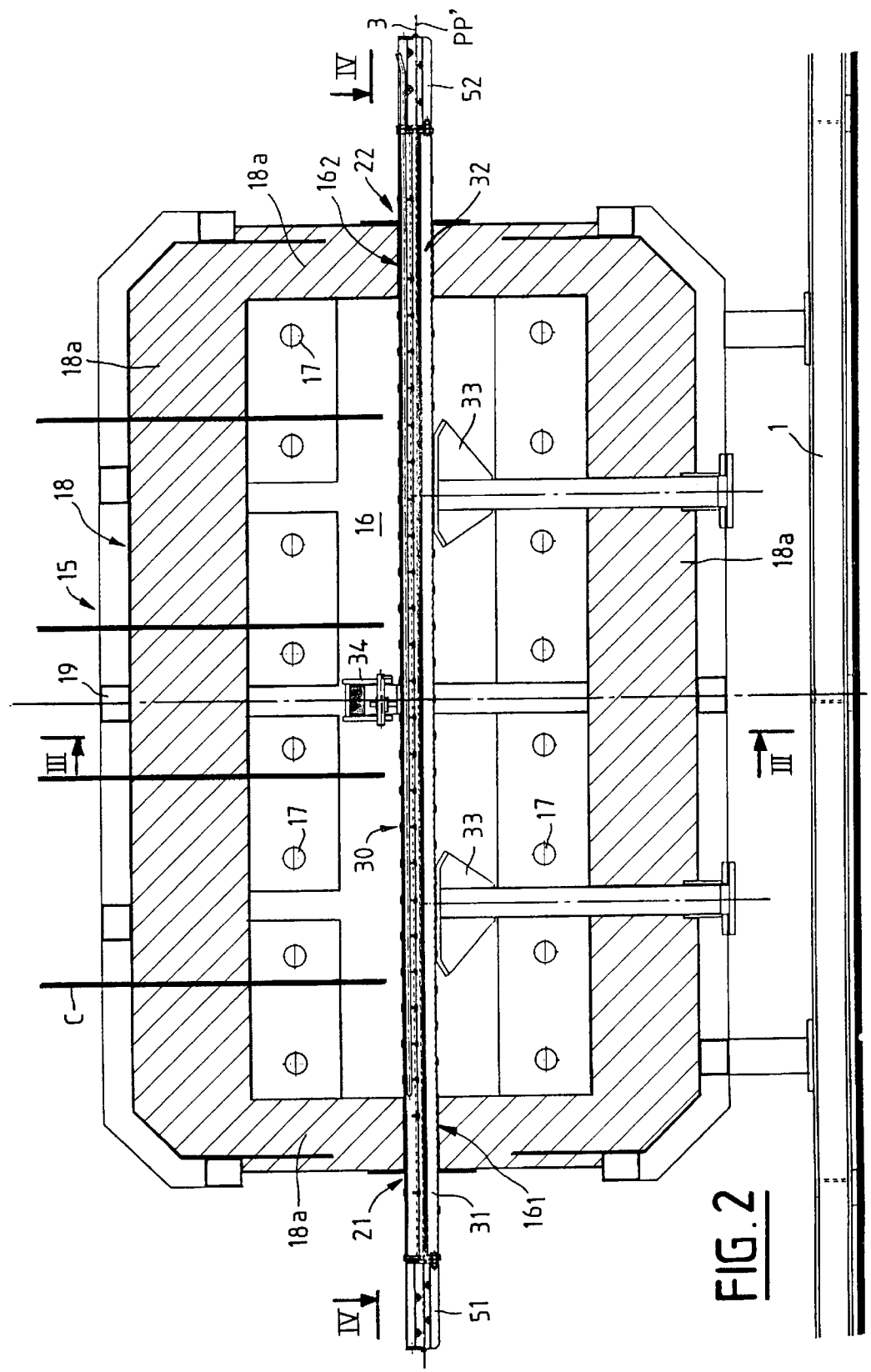
FIG. 2 is an elevation section showing certain dispositions of the invention diagrammatically and on a larger scale.
Figure 3:
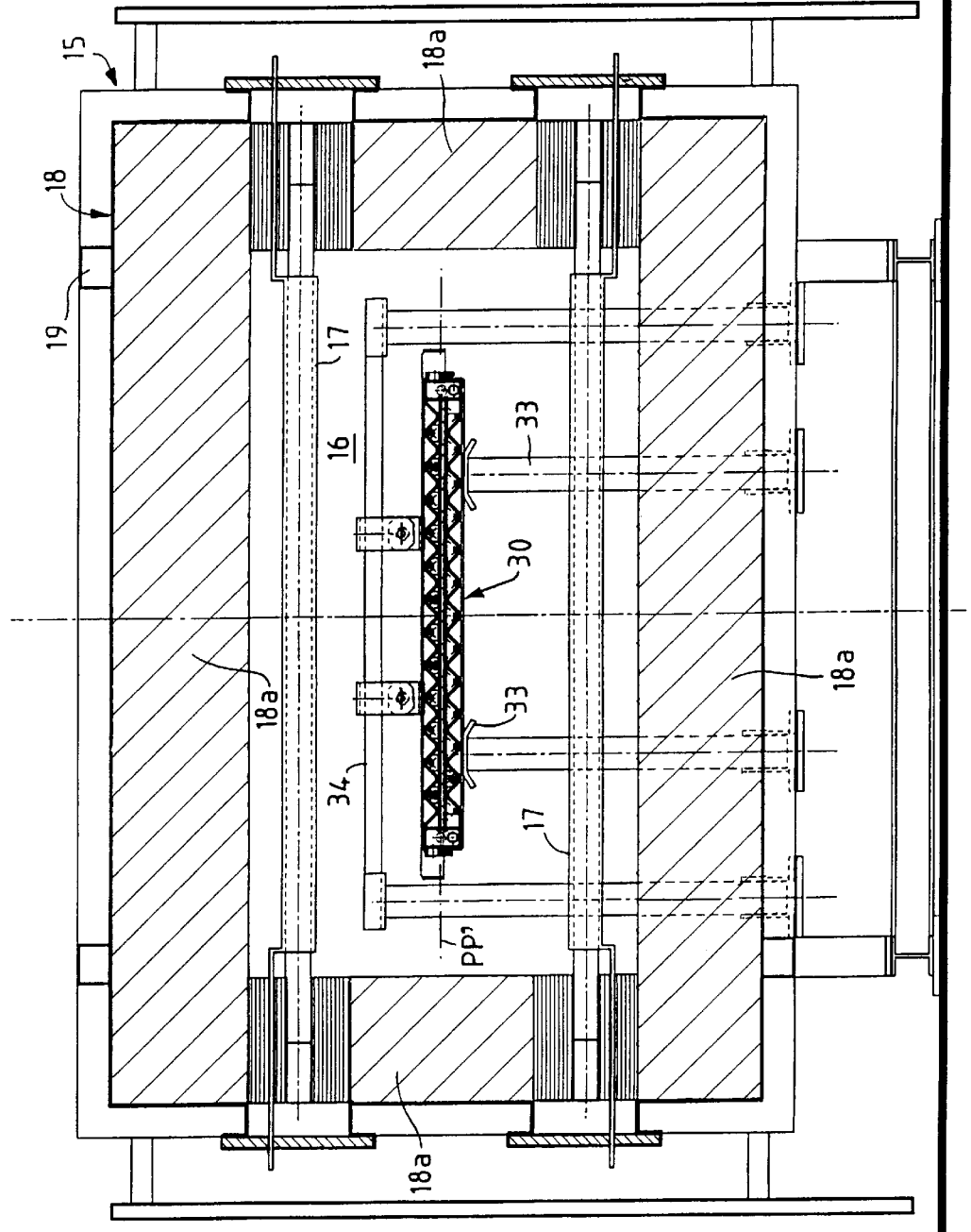
FIG. 3 is a cross-section on line III—III of FIG. 2.

In the advantageous embodiment shown in FIGS. 2 and 3, the resistance elements 17 are disposed in an enclosure 18 associated with thermal insulation means 18a and carried by a case 19 which is mounted on the support frame 1. The enclosure 18 defines a horizontally extending travel, conveyor, or through path extending through the horizontal heat treatment zone 16 and delimiting or defining the displacement plane P–P' which corresponds to the sheet 3 during activation treatment.

The heater means or elements 17 are organized or installed in such a manner as to ensure that a uniform temperature obtains in the horizontal heat treatment zone 16, said temperature lying in the range 800° C. to 1000° C. and preferably in the range 850° C. to 950° C.

The thermal insulation means are also provided over the walls of the enclosure through which the through path penetrates to define a temperature-raising zone $16_1$ and a temperature-lowering zone $16_2$ for the sheet 3. The zones $16_1$ and $16_2$ are established in such a manner as to be placed For the zone $16_1$ between an inlet section 21 and the zone 16, and for the zone $16_2$ beetween the zone 16 and an outlet section 22.

The thermal insulation means and/or the architecture of the furnace are also selected in such a manner that within the heat treatment zone 16 the maximum temperature difference between any two points is restricted to a value of about 2° C. By restricted between any two points, particular attention should be paid to differences taken transversely to the arrow $f_2$.

In one structure for a furnace of the invention, the horizontal heat treatment zone and the temperature-raising and -lowering zones are implemented inside the enclosure by a muffle 30 which is made in the form of a shallow box or tunnel extending horizontally inside the enclosure 18 along the plane P–P', and carried by the case 19 so as to extend between the inlet and outlet sections 21 and 22 thereof With such a disposition, the above-specified requirement for restricted temperature differences can be satisfied by giving the enclosure a transverse dimension such that the distance between the side wall and the corresponding side of the muffle is not less than one-fourth of the width of the muffle and is preferably equal to one-third the width.

The muffle 30 has its inlet end portion 31 engaged in the inlet section 21 and it is slidably carried by its outlet end portion 32 in the outlet section 22. The muffle 30 is slidably carried by supporting posts 33 of adjustable height projecting up into the enclosure 18 from the bottom structure of the case 19. The middle portion of the muffle 30 is also suspended slidably from a gentry 34 inside the enclosure and likewise extending vertically upwards from the bottom structure of the case 19.

Position sensors C are organized along the entire length of the muffle 30 in association with the top thereof so as to provide information about deformations or displacements caused by temperature increases so as servo-control the adjustment of the supporting posts 33 and of the gantry 34.

Figure 4:
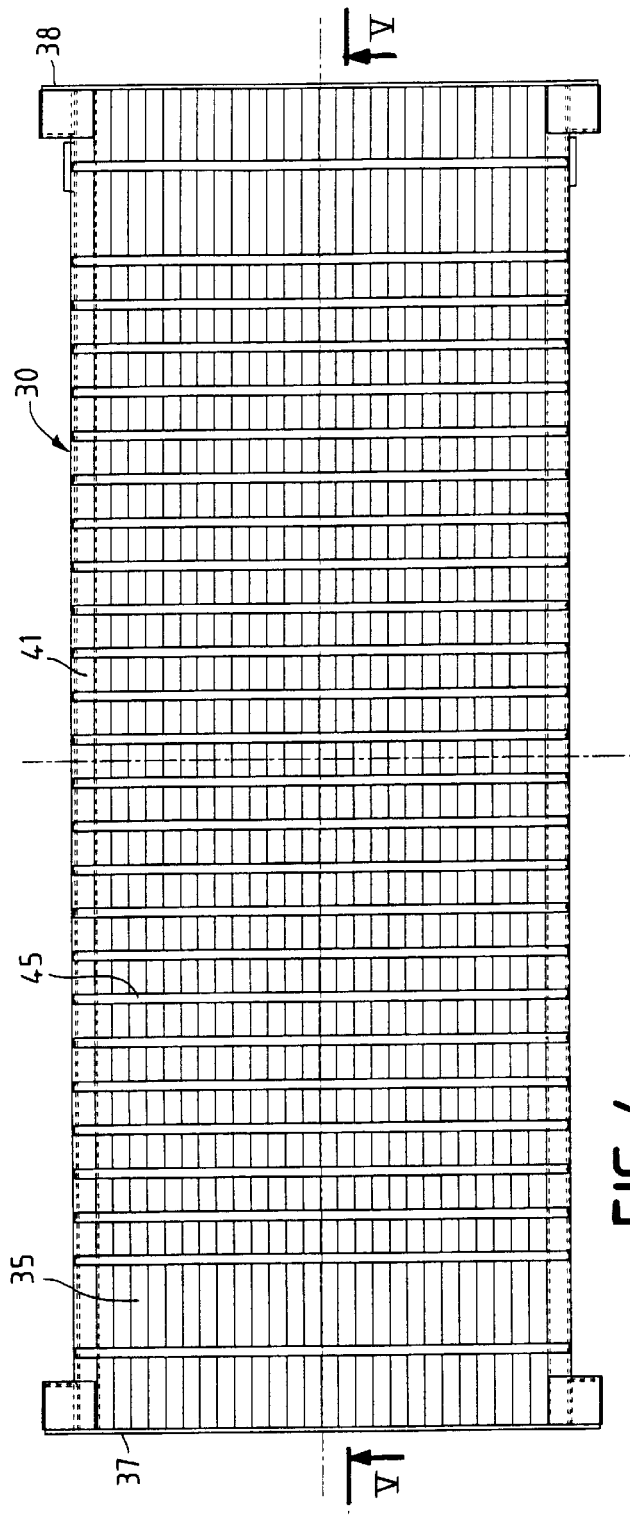
FIG. 4 is a plan view corresponding to line IV—IV of FIG. 2.
Figure 5:
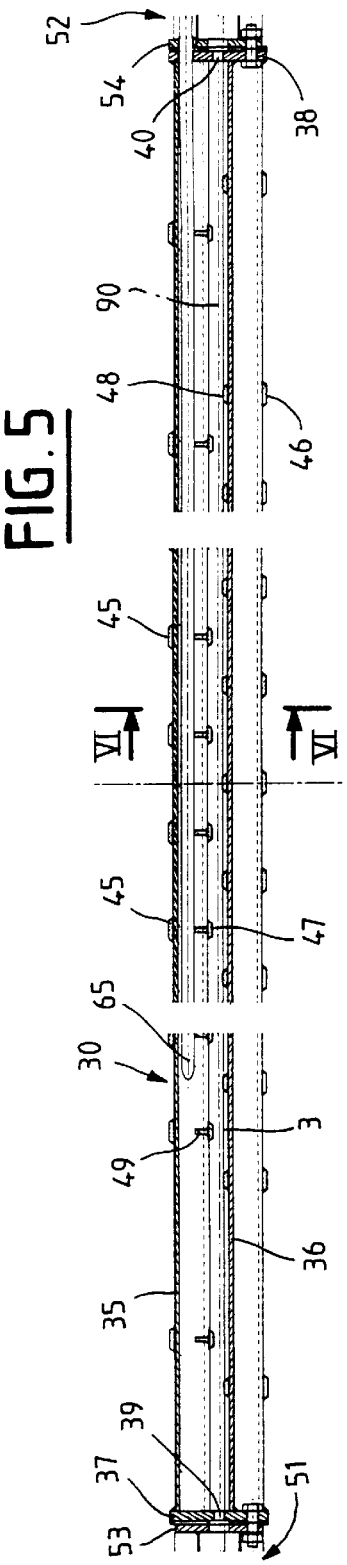
FIG. 5 is a section on a different scale on line V—V of FIG. 4.

As can be seen from FIGS. 4 to 6, the muffle 30 is made in a special manner so as to be capable of withstanding the effects of the heat inside the enclosure 18 without being subjected to significant deformation that could impede free movement of the sheet 3. The muffle 30 is also made so as to define a treatment volume that is as small as possible to constitute a confinement cavity for an oxidizing gaseous fluid, as described below.

To reconcile the above requirements with the need to establish the muffle over a length that is relatively long, e.g. about 3 meters (m) to 4 m which is more favorable to applying a uniform activation process to the fibrous sheet, it is recommended in the invention to make the muffle 30 out of two superposed plates 35 and 36 having corrugations of the same pitch and the same amplitude and extending in the direction of the arrow $f_2$, which corrugatiorns are exactly superposed so as to define a gap of constant height between them. The walls 35 and 36 respectively constitute, so to speak, the top and the bottom of the muffle and they are connected together at their upstream and downstream ends by end plates 37 and 38 defining two through slots 39 and 40. The walls 35 and 36 are also connected together along their sides by two side rails 41 and 42 which are preferably tubular or box section, and which can be used for housing various fluid lines such as those referenced 43 in dashed lines in FIG. 6 or those referenced 44 also shown in FIG. 6 and capable of opening out at intervals into the inside of the muffle so as to enable measurement samples to be taken of the treatment medium which is established inside the muffle while the activation process is taking place on the sheet 3. The structure adopted for making the muffle as described above demonstrates the need to withstand deformation under the effect of temperature. That is why the walls 35 and 36 have corrugations which have a stiffening effect. The same applies to the end plates 37 and 38 and to the side rails 41 and 42.

To impart even better deformation-resisting characteristics, provision is also made to stiffen the walls 35 and 36 transversely by means of outside bars 45 and 46 which are welded to the outside tops and the bottoms of the corrugations and by inside bars 47 and 48 which are welded to the inside bottoms and tops of the muffle. Additionally, the inside bars 47 and 48 may be connected to the concave grooves of the corrugations by gusset plates 49 and 50, as shown in FIGS. 5 and 6.

The presence of the inside bars 47 and 48 has the effect of defining the right cross-section that is available for passage of the sheet 3 which finds a sliding and support plane corresponding to the plane P–P' embodied by the tops of the bars 48.

For each wall, the inside and outside bars associated with the wall 35 and with the wall 36 are disposed in common transverse planes and are connected together, as can be seen in FIG. 6, more particularly at the box sections or side rails 41 and 42 so as to constitute, so to speak, kinds of transverse belts or bands at intervals for each of the walls. It is also advisable to offset the planes of said bands or belts from one of the walls 35 and 36 to the other, as can be seen in FIG. 5.

As can be seen in FIG. 7, the muffle 30 is finished off by two air locks, respectively an inlet air lock 51 and an outlet air lock 52 made in substantially the same manner as the muffle itself, each having a respective end plates 53 or 54 for connection to a respective one of the end plates 37 and 38. The end plates 53 and 54 define slots 55 and 56 which are placed in coincidence with the slots 39 and 40 for passing the sheet 3, as represented by the chain-dotted line. The air locks 51 and 52 have stiffening shapes 57 and 58 defining end inlet and outlet mouths $59_1$ and $59_2$ which may be fitted with seals $61_1$ and $61_2$ in the form of elastically deformable lips.

Internally and at least in those portions of the corrugations of its wall 35 that define grooves relative to the inside volume of the muffle, the muffle 30 is fitted with pipes 65 extending along the entire length of the muffle and provided with nozzles 66 for delivering oxidizing gas, which nozzles are open or directed so as to cover an angular range such as $\alpha$ that overlap sideways with the ranges of the immediatly adjacent pipes, such that the entire transverse size or extent of the sheet 3 can be considered as being covered by the succession of pipes. The nozzles 66 may naturally be constituted by any appropriate type of gas-delivering outlet member. Similar pipes 67 may also be provided in the muffle in the groove portions (relative to the inside volume of the muffle) of the corrugations in the wall 36, with such pipes having the same structural characteristics concerning the angular ranges $\alpha$ of the nozzles or outlets.

In a variant embodiment, the pipes are relatively far from the wall 35 or 36 and they are the other way round so that the nozzles 66 or the like are directed towards said wall which then performs a homogenizing reflection function on the oxidizing gas and a function of distribution and diffusion by vaporization.

The pipes 65 and 67 extend along the entire width of the muffle 30 and they are carried by the end plates 37 and 38 beyond it least one of which, e.g. the end plate 38, the various pipes may extend while no longer having nozzles or outlets so as to enable them to be connected via a common transverse manifold e.g. to a source (not shown) for supplying an oxidizing gaseous fluid which is delivered to the inside of the confinement volume of the muffle 30 at a pressure close to atmospheric pressure.

As can be seen in FIG. 6, the muffle 30 may also be fitted locally with measurement-taking lines 70 which are disposed internally, e.g. being centered in the gusset plates 50. Such measurement lines 70 may, for example, serve to measure the temperature imposed on the muffle by the heater means 17 at various different points.

As can be seen in FIG. 1, another structural characteristic of the muffle stems from the way in which connections are provided between the end portions 31 and 32 and the structure or case 19 of the enclosure 18, as described above.

Beyond the enclosure, the outlet end portion 32 is connected, e.g. by means of the outlet air lock 52, to a traction drive member 71 capable of subjecting the muffle 30 to permanent traction stress during application of the optimum temperature for implementing the above-described process.

The traction member 71 may be constituted by one or more actuators such as one or more hydraulic cylinders connected to the support frame 1 and acting on the outlet end portion 32. It may be advantageous to cause the rod 72 of the cylinder 71 to act on a flexible link such as a chain 73 fitted to the end portion 32.

An inspection of FIGS. 1 and 2 shows that the muffle is fitted at its end portions 31 and 32 which extend outside the enclosure 18 with two envelopes or jackets $76_1$ ou $76_2$ through which a cooling fluid is caused to flow to provide a thermal barrier and limit propagation of temperature to portions of the muffle outside the enclosure 18.

The end portions 31 and 32 are also fitted at the air locks 51 and 52 with boxes $78_1$ and $78_2$ which are maintened, by an appropriate installation, at a reduced relative pressure so as to extract the oxidation gases or reaction gases that develop inside the muffle while the activation process is taking place. Theses boxes serve to collect the extracted gases and deliver them to an installation for treatment or destruction so as to avoid any risk of them diffusing out into the surrounding medium or into the premises housing the furnace. On the same lines, provision may also be made, as shown in FIG. 7, to provide each air lock 51 or 52 with one or more pipes 80 delivering a neutral gaseous fluid, such as nitrogen, which is delivered in the form of a curtain, e.g. at the stiffening shapes 57 as shown in chain-dotted lines to reduce the risk of the activation or reaction gaseous medium that exists inside the muffle 30 diffusing to the outside.

Finally, the installation has a drive device 85 located beyond the enclosure 18 under consideration in the direction of the arrow $f_2$ and carried by the support frame 1. The drive device 85 is thus interposed between the outlet air lock 52 and winding station 4. The device 85 is selected so as to provide a self-contained motor unit 86 which enables it, via an Ω type drive device, to subject the sheet 3 coming from the activation furnace to travel at controlled constand speed. Beyond the device 85, the sheet is taken up by a regulator device 87 prior to being wound on the spool 9.

Using the installation as described above takes place as follows.

Power is supplied to the heater members 17 in such a manner as to cause the temperature inside the enclosure 18, and more particularly inside the muffle 30 to lie in the range 900° C. to 930° C. The component means used cause the zones 18a and 18b to be subjected, for example, respectively to progressive temperature rise conditions from ambient to 910° C. over a distance of about 40 cm for the chamber $18_1$ and to progressive temperature fall conditions for the chamber $18_2$ from about 910° C. to about 200° C. over the same distance.

The sheet 3 is wound out from the spool 6 so as to be engaged from the inlet section 31 and via the inlet air lock 51 into the inside of the muffle 30 in which it is carried by the inside bars 48 to run along the plane P–P' and be caused to leave the muffle 30 via the outlet section 32 and the outlet air lock 52.

Simultaneously, the drive members 71 are put into operation so as to exert a traction force of about 550 kg on the outlet end portion of the muffle while the temperature of the furnace is initially being raised, and a force of 150 kg while conditions favorable for performing the process are being maintained.

To avoid damaging the installation at the end of the activation process, when the entire furnace is placed in a standby or non-functioning state, the members 71 maintain a traction force of about 150 kg throughout the cooling stage.

Simultaneously, the position sensors C are activated to servo-control the vertical adjustement of the support posts 33 and the support gantry 34.

The drive device 85 causes the sheet 3 to be moved linearly inside the muffle 30 along arrow $f_2$.

By means of the pipe 65 and/or 67, an oxidizing gaseous mixture is diffused inside the muffle.

In another disposition of the invention, a screen 90 is advantageously provided in the muffle 30, the screen being in the from of a mesh overlying the plane P–P' that is occupied by the sheet 30, so that the mesh is placed above the sheet.

As can be seen by comparing FIGS. 5 and 6, the screen 90 is thus located beneath the diffusion pipes 65 and it performs three special functions.

The first function is to make gas diffusion from the top pipes more uniform. Its second function is to make temperature more uniform, and its third is to constitute a screen against falling drops or condensate which might come from the injection pipes 65 and/or the outlets or nozzles 66 and which because of their local concentration on the moving sheet could have harmful effects or even effects that are damaging to the integrity of the fiber structure subjected to activation.

Such a screen 90 constitutes a kind of homogenizing distribution filter and it may advantageously be made of silicon carbide or graphite cloth.

The invention is not limited to the examples described and shown since numerous modifications can be applied thereto without going beyond the ambit of the invention.

We claim:

1. An activation furnace for activating a fibrous sheet comprising carbonized yarns or filaments, said furnace comprising:

an activation enclosure extending horizontally and possessing an inlet section and an outlet section through which a continuous fibrous sheet may travel so as to pass horizontally through said enclosure, said enclosure defining at least one heat treatment zone and, at opposite ends thereof, a temperature-raising zone and a temperature-lowering zone, said enclosure being constituted by a muffle disposed in an envelope, said envelope being carried by a case and containing a heater means, vertically adjustable supports and a vertically adjustable gantry;

means for diffusing an oxidizing gaseous fluid within said enclosure; and air locks fitted to said inlet and outlet sections of said enclosure, said air locks being connected to cooling and suction means;

wherein said muffle comprises a shallow horizontal tunnel through which the fibrous sheet may travel, said tunnel being secured to said the case at its inlet end portion, mounted free to slide substantially horizontally relative to said case at its outlet end portion, and supported with freedom to slide via said vertically adjustable supports and in its middle portion via said vertically adjustable gantry.

2. An activation furnace according to claim 1, wherein said muffle defines a plurality of treatment zones.

3. An activation furnace according to claim 1, wherein said envelope is associated with thermal insulation means.

4. An activation furnace according to claim 1, further comprising:

position sensors and servo-controlling means for adjusting said supports and said gantry associated with said muffle inside said envelope.

5. An activation furnace according to claim 1, wherein said muffle further comprises:

an outlet terminal portion; and means for subjecting said muffle to adjustable traction stress acting longitudinally and substantially horizontally via said outlet end portion.

6. An activation furnace according to claim 1, further comprising:

internal temperature sensors associated with said muffle for regulating power supplied to said heater means.

7. An activation furnace according to claim 1, further comprising:

means for limiting the temperature gradient, at least between all points extending transversely to the travel direction of the sheet, to no more than 2° C.

8. An activation furnace according to claim 7, wherein said means for limiting the temperature gradient comprises:

thermal insulation for said envelope and a dimension of said envelope such that a transverse gap between a wall of said envelope and a corresponding side of said muffle is not less than one-fourth the width of said muffle.

9. An activation furnace according to claim 1, said muffle further comprising:

a sheet support plane; and an internal mesh disposed above and substantially parallel to said sheet support plane.

10. An activation furnace according to claim 1, said muffle further comprising:

end plates; and two lateral stiffening box sections cooperating with said end plates to define a wall-reinforcing band.

11. An activation furnace according to claim 10, further comprising:

sampling tubes housed in said lateral stiffening box sections, said sampling tubes opening out at intervals to the inside of said muffle.

12. An activation furnace according to claim 1, wherein said air locks further comprise:

seals through which the sheet can pass.

13. An activation furnace according to claim 1, further comprising:

a device for driving the sheet at constant speed and a device for winding the sheet onto a storage spool located beyond said driving device, said driving device being disposed at an outlet from said activation enclosure.

14. An activation furnace for activating a fibrous sheet comprising carbonized yarn or filaments, said furnace comprising:

an activation enclosure constituted by a muffle disposed in an envelope, said envelope being carried by a case and containing heater means, said activation enclosure extending horizontally and possessing an inlet section and an outlet section through which a continuous fibrous sheet may travel so as to pass horizontally through said enclosure, said enclosure defining at least one heat treatment zone and, at opposite ends thereof, a temperature-raising zone and a temperature-lowering zone;

means for diffusing an oxidizing gaseous fluid within said enclosure; and air locks fitted to said inlet and outlet sections of said enclosure, said air locks being connected to cooling and suction means;

wherein said muffle comprises two longitudinal parallel walls having corrugations extending longitudinally and forming top and bottom walls of said muffle, said walls being connected together at their inlet and outlet edges via end plates, said end plates defining two slots through which the sheet passes and carrying said air locks.

15. An activation furnace according to claim 14, wherein said envelope contains vertically adjustable supports and a vertically adjustable gantry and wherein said muffle is secured to said case at its inlet end portion, mounted free to slide substantially horizontally relative to said case at its outlet end portion, and supported with freedom to slide via said vertically adjustable supports and in its middle portion via said vertically adjustable gantry.

16. An activation furnace according to claim 15, wherein said muffle defines a plurality of treatment zones.

17. An activation furnace according to claim 15, wherein said envelope is associated with thermal insulation means.

18. An activation furnace according to claim 15, further comprising:

position sensors and servo-controlling means for adjusting said supports and said gantry associated with said muffle inside said envelope.

19. An activation furnace according to claim 15, wherein said muffle further comprises:

an outlet terminal portion; and means for subjecting said muffle to adjustable traction stress acting longitudinally and substantially horizontally via said outlet end portion.

20. An activation furnace according to claim 15, wherein said walls constituting said top and said bottom walls of said muffle are disposed so that said corrugations thereof are exactly superposed.

21. An activation furnace according to claim 15, further comprising:

transverse stiffening bars extending at least over inside faces of said muffle, said transverse stiffening bars being associated with said walls.

22. An activation furnace according to claim 21, wherein some of said transverse stiffening bars inside said muffle define a bottom support and sliding plane for the fibrous sheet.

23. An activation furnace according to claim 15, wherein said muffle further comprises:

internally longitudinal diffusion pipes having nozzles for diffusing an oxidizing gaseous fluid.

24. An activation furnace according to claim 23, wherein said diffusion pipes are disposed in furrows inside said muffle, said furrows being defined by said corrugations.

25. An activation furnace according to claim 23, wherein said diffusion pipes are disposed so that said nozzles are directed towards said walls of said muffle.

26. An activation furnace according to claim 15, further comprising:

internal temperature sensors associated with said muffle for regulating power supplied to said heater means.

27. An activation furnace according to claim 15, further comprising:

means for limiting the temperature gradient, at least between all points extending transversely to the travel direction of the sheet, to no more than 2° C.

28. An activation furnace according to claim 27, wherein said means for limiting the temperature gradient comprises:

thermal insulation for said envelope and a dimension of said envelope such that a transverse gap between a wall of said envelope and a corresponding side of said muffle is not less than one-fourth the width of said muffle.

29. An activation furnace according to claim 15, said muffle further comprising:

a sheet support plane; and an internal mesh disposed above and substantially parallel to said sheet support plane.

30. An activation furnace according to claim 15, said muffle further comprising:

end plates; and two lateral stiffening box sections cooperating with said end plates to define a wall-reinforcing band.

31. An activation furnace according to claim 30, further comprising:

sampling tubes housed in said lateral stiffening box sections, said sampling tubes opening out at intervals to the inside of said muffle.

32. An activation furnace according to claim 15, wherein said air locks further comprise:

seals through which the sheet can pass.

33. An activation furnace according to claim 15, further comprising:

a device for driving the sheet at constant speed and a device for winding the sheet onto a storage spool located beyond said driving device, said driving device being disposed at an outlet from said activation enclosure.

34. An activation furnace according to claim 14, wherein said muffle defines a plurality of treatment zones.

35. An activation furnace according to claim 14, wherein said envelope is associated with thermal insulation means.

36. An activation furnace according to claim 14, wherein said walls constituting said top and said bottom walls of said muffle are disposed so that said corrugations thereof are exactly superposed.

37. An activation furnace according to claim 14, further comprising:

transverse stiffening bars extending at least over inside faces of said muffle, said transverse stiffening bars being associated with said walls.

38. An activation furnace according to claim 37, wherein some of said transverse stiffening bars inside said muffle define a bottom support and sliding plane for the fibrous sheet.

39. An activation furnace according to claim 14, wherein said muffle further comprises:

internally longitudinal diffusion pipes having nozzles for diffusing an oxidizing gaseous fluid.

40. An activation furnace according to claim 39, wherein said diffusion pipes are disposed in furrows inside said muffle, said furrows being defined by said corrugations.

41. An activation furnace according to claim 39, wherein said diffusion pipes are disposed so that said nozzles are directed towards said walls of said muffle.

42. An activation furnace according to claim 14, further comprising:

internal temperature sensors associated with said muffle for regulating power supplied to said heater means.

43. An activation furnace according to claim 14, further comprising:

means for limiting the temperature gradient, at least between all points extending transversely to the travel direction of the sheet, to no more than 2° C.

44. An activation furnace according to claim 43, wherein said means for limiting the temperature gradient comprises:

thermal insulation for said envelope and a dimension of said envelope such that a transverse gap between a wall of said envelope and a corresponding side of said muffle is not less than one-fourth the width of said muffle.

45. An activation furnace according to claim 14, said muffle further comprising:

a sheet support plane; and an internal mesh disposed above and substantially parallel to said sheet support plane.

46. An activation furnace according to claim 14, said muffle further comprising:

end plates; and two lateral stiffening box sections cooperating with said end plates to define a wall-reinforcing band.

47. An activation furnace according to claim 46, further comprising:

sampling tubes housed in said lateral stiffening box sections, said sampling tubes opening out at intervals to the inside of said muffle.

48. An activation furnace according to claim 14, wherein said air locks further comprise:

seals through which the sheet can pass.

49. An activation furnace according to claim 14, further comprising:

a device for driving the sheet at constant speed and a device for winding the sheet onto a storage spool located beyond said driving device, said driving device being disposed at an outlet from said activation enclosure.

* * * * *